(12) United States Patent
Tibbitts

(10) Patent No.: US 8,132,780 B2
(45) Date of Patent: Mar. 13, 2012

(54) SUBSEA COUPLING

(75) Inventor: Matthew H Tibbitts, Subiaco (AU)

(73) Assignee: Aker Subsea Limited, Maidenhead, Berkshire (GB)

( * ) Notice: Subject to any disclaimer, the term of this patent is extended or adjusted under 35 U.S.C. 154(b) by 294 days.

(21) Appl. No.: 12/519,188

(22) PCT Filed: Nov. 5, 2007

(86) PCT No.: PCT/GB2007/004208
§ 371 (c)(1),
(2), (4) Date: Aug. 4, 2009

(87) PCT Pub. No.: WO2008/074973
PCT Pub. Date: Jun. 26, 2008

(65) Prior Publication Data
US 2010/0024907 A1 Feb. 4, 2010

(30) Foreign Application Priority Data
Dec. 19, 2006 (GB) .................................. 0625227.4

(51) Int. Cl.
*F16L 37/36* (2006.01)
(52) U.S. Cl. ................ 251/149.7; 137/614.04; 285/108; 285/111
(58) Field of Classification Search .......... 137/614, 137/614.03–614.05; 251/149.1, 149.6, 149.7; 285/108, 111, 917, 379
See application file for complete search history.

(56) References Cited

U.S. PATENT DOCUMENTS

| 4,709,726 | A | 12/1987 | Fitzgibons | |
|---|---|---|---|---|
| 4,768,538 | A | 9/1988 | Mintz et al. | |
| 6,202,691 | B1 | 3/2001 | Smith, III | |
| 6,962,347 | B2* | 11/2005 | Smith, III | 137/614.04 |

FOREIGN PATENT DOCUMENTS

| GB | 2 394 994 | 5/2004 |
|---|---|---|
| GB | 2 407 628 | 5/2005 |
| JP | 2005-223395 | 8/2005 |
| JP | 2007-201616 | 8/2007 |
| JP | 2007-235482 | 9/2007 |

OTHER PUBLICATIONS

International Search Report for PCT/GB2007/004208 mailed Mar. 11, 2008.
Written Opinion for PCT/GB2007/004208 mailed Mar. 11, 2008.

* cited by examiner

Primary Examiner — Kevin Lee
(74) Attorney, Agent, or Firm — Nixon & Vanderhey PC

(57) ABSTRACT

A subsea female coupler has a body defining a socket for the reception of a probe of a male coupler. The socket includes an annular shoulder and, outwardly of the shoulder, a part-conical seat which tapers towards the interior of the socket. An annular seal is disposed to provide radial sealing between the socket and the probe and is positioned in the annular shoulder. A metal retainer in the form of a securing ring, which has a bevelled rim for abutment with the seat, provides sealing between the region of the seal and the exterior of the body of the coupler. The retainer has a screw-threaded periphery for engagement with a complementary thread on the interior of the socket. An inner ring liner fits within the retainer and has a flange for abutting the seal.

12 Claims, 1 Drawing Sheet

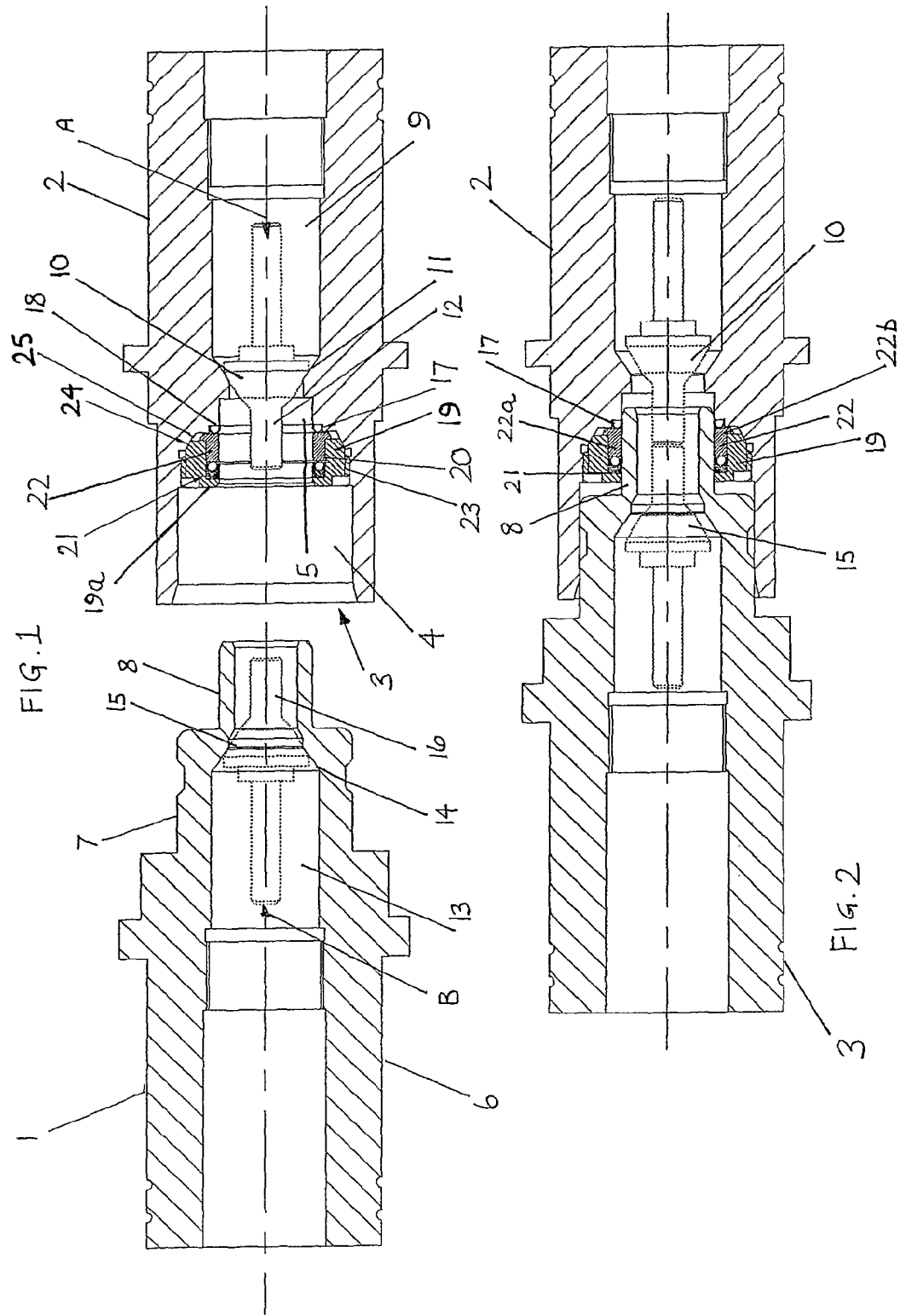

SUBSEA COUPLING

This application is the U.S. national phase of International Application No. PCT/GB2007/004208 filed 5 Nov. 2007 which designated the U.S. and claims priority to British Patent Application No. 0625227.4 filed 19 Dec. 2006, the entire contents of each of which are hereby incorporated by reference.

TECHNICAL FIELD

This application relates to subsea couplings and, in particular, to an improved construction for a female coupler which defines a socket for receiving the probe of a male coupler.

BACKGROUND

Couplers of this general nature are well known for use in subsea equipment, particularly associated with subsea wellheads, and are normally used to allow connection of highly pressurized hydraulic fluid. Very typically there is provided a 'stab plate' on which an array of couplers is mounted and which can provide simultaneous connection of a multiplicity of coupling pairs.

Couplers of this general nature usually have self-sealing valves which are usually constituted by spring-loaded poppet valves, one in each coupler, and are arranged so that when the couplers are mated the valve poppets are lifted from their respective seats to provide fluid connection between the couplers. However, the invention is not limited to this form of connection.

It is usually necessary to provide a seal between the probe of the male coupler and its receiving socket. For convenience such a seal is disposed, usually in an internal annular recess, in the body of the female coupler and normally this seal provides a radial seal between the socket and the probe. For preference, this (primary) seal provides a metal-to-metal sealing between the couplers and although several different forms of seal have been proposed, one preferred form is a metal seal in the form of a hollow ring which can provide radial sealing between the couplers. For preference there is more than one seal and it is known to provide a secondary, polymeric, hollow annular seal spaced apart from the primary seal and likewise providing radial sealing between the couplers.

It is necessary to provide a means of retaining at least the primary seal and preferably also the secondary seal within the female coupler. The main object of the invention is to provide an improved retainer of simple and reliable construction, which can provide a direct seal with the female coupler so as to provide sealing between the region of the primary seal that it retains and the exterior of the coupler. One purpose of such a seal is the prevention of leakage from the coupler should the primary seal be displaced or otherwise fail.

Three examples of the state of the art are the documents U.S. Pat. No. 4,834,139-A, GB-2407628-A and GB-2394994-A.

In the coupling described in U.S. Pat. No. 4,834,139-A, the metal C-seal is disposed in an annular shoulder at the rim of the socket and is retained by means of an external sleeve which also has an internal annular groove that accommodates an elastomeric O-ring constituting a second radial seal between the couplers. In the coupling described in GB-2407628-A, the C-seal is loosely disposed in a shoulder at the end of a seal carrier, which has an annular groove outwardly spaced form the shoulder and accommodating an O-ring which makes an axial seal with the body of the coupler. This groove is formed in an annular ridge with sloping sides engaging a complementary groove in the coupler. The carrier also carries an elastomeric crown seal and is retained in the socket by another threaded sleeve. In the coupling described in GB-2394994-A, the C-seal is loosely positioned in an annular shoulder at the end of an internal seal carrier which has a conical recess abutting a conical protrusion surrounding the socket in the female coupler. A separate threaded sleeve is required to retain the seal carrier in position.

SUMMARY

In a preferred example, a subsea female coupler comprises a body defining a socket for the reception of a probe of a male coupler, the socket including an annular shoulder and, outwardly of the shoulder, a part-conical seat which tapers towards the interior of the socket. An annular seal, preferably a metal C-seal, is disposed to provide radial sealing between the socket and the probe and is positioned in the annular shoulder. A retainer, which has a bevelled rim for abutment with said seat, provides sealing, preferably metal-to-metal sealing, between the region of the annular seal and the exterior of the body of the coupler. The retainer has a screw-threaded periphery for engagement with a complementary thread on the interior of the socket, the retainer serving to maintain the annular seal in position.

An inner ring liner may be fitted within retainer and be positioned to abut the annular seal. This inner ring liner may comprise a tubular part disposed within the securing ring and an end flange which is held between the retainer and the body of the coupler.

The retainer may define with the inner ring liner an inner annular recess bounded by an inwardly directed flange of the retainer. This inner annular recess can accommodate a secondary seal, which may be an elastomeric annular seal.

The aforementioned socket may be separated from a chamber within the body of the coupler by a valve seat and the coupler may include a poppet valve for engagement with the valve seat.

The exemplary embodiment extends to a subsea coupling comprising the female coupler and a male coupler adapted to mate with the female coupler.

BRIEF DESCRIPTION OF THE DRAWINGS

FIG. 1 illustrates a pair of subsea couplers shown before their mutual engagement; and FIG. 2 illustrates the couplers in mating engagement.

DETAILED DESCRIPTION OF AN EXEMPLARY EMBODIMENT

In FIG. 1 is shown a male coupler 1 spaced apart though in alignment with a female coupler 2 before the two couplers are brought into mating engagement as shown in FIG. 2. The couplers are intended for use subsea in the usual manner of subsea couplers for the purpose of, for example, connecting pressurized hydraulic lines together.

The coupler 2 defines an internal socket 3 which has an outer chamber 4 and an inner chamber 5. The male coupler has a body 6 which at its forward end has a reduced diameter part 7 that fits inside the outer chamber 4 of the socket 3 and a forward probe 8 constituted by a hollow cylindrical part of which the outer periphery fits inside the inner chamber 5 of the socket 3.

The female coupler 2 has a rear chamber 9 of which fluid communication with the chamber 3 is controlled by a valve 10. In this embodiment the valve 10 is a poppet valve which seals against a conical seat 11 between the chamber 9 and the socket 3. This poppet valve may, as is customary, be provided with a spring bias constituted for example by a compression spring engaging the rear of the poppet valve and disposed at its other end to engage some datum in the body of the female coupler. For convenience, the details of this form of automatic closure has been omitted but are schematically illustrated by the arrow A showing the direction of the closure force. The poppet valve has a forward extension or 'nose' 12 which extends into the inner chamber 5 of the socket 3.

Likewise, the male coupler 1 has an internal chamber 13 which is separated from the interior of the probe part 8 by a conical valve seat 14 and can communicate with the interior of the probe on the lifting of a valve 15 from the conical seat 14. The valve 15 has a nose 16 which can engage the nose 12 of the valve 10. Again, this valve 15 may be provided with a spring bias to provide normal closure of the valve against the seat 14 and for simplicity the effect of the spring is shown by the arrow B. In both cases, the closure mechanism may be as described for example in GB-A-2257219 or in GB-2431453-A. The poppet valves 10 and 15 themselves may also be as described in GB-2431453-A.

It is desirable and customary to provide an annular seal between the couplers and particularly between the outer periphery of the probe 8 and the inner periphery of the female coupler, and particularly the inner periphery of the inner chamber 5 of the socket 3. In the present example, a primary seal for this purpose is constituted by a hollow, annular, metal seal (usually called a C-ring seal) 17, which is located in a small annular shoulder 18 at the rim of the inner periphery of the chamber 5.

The seal 17 is maintained in position by means of a retainer 19 in the form of a securing ring. This retainer engages the interior of the socket 3. The retainer 19 has at its outer end an inwardly extending annular flange 19a. This flange defines the end of an internal annular recess 20 in which are disposed a secondary annular hollow polymeric seal 21 and an inner ring 22 which acts as a liner through which the probe 8 slides before it passes the seal 17 and enters the inner part 5 of the socket 3. The inner ring 22 has a tubular part 22a within the securing ring and an end flange 22b (FIG. 2) which is held between the retainer 19 and the body of the coupler 2. This end flange 22a abuts the C-ring seal 17. The inner ring 22 also defines with the securing ring 19 an annular recess in which the secondary seal 21 is located and also serves as a spacer between the seals 17 and 21.

The retainer 19 is very preferably metallic, for example it may comprise 'Nitronic 60'. The inner liner 22 is also preferably metallic; likewise it may comprise 'Nitronic 60'. The C-seal 17 may comprise gold-plated Iconel 718. The elastomeric seal 21 may be made from carbon-filled PTFE and include a cobalt-chrome alloy 'Energiser' ring and a PEEK back-up ring.

The retainer 19 has in this example an external screw threading 23 which engages with a complementary screw threading on the interior of the chamber 3. Furthermore, the retainer 19 has a part-conical bevelled rim 24 which abuts a part-conical valve seat 25. This seat tapers inwardly towards the interior of the coupler 2. Thus the retainer 19 provides a sealing region between the region of the seal 17 and the exterior of the female coupler. Very preferably this is a metal-to-metal sealing which provides reliable protection against leakage of hydraulic fluid should the primary seal 17 fail.

FIG. 2 illustrates the couplers 1 and 2 in mating engagement. In this particular example the poppet valves 10 and 15 are self-sealing and mutually engageable to provide opening, for this purpose the forward extensions of the respective poppet valves are disposed to engage each other as the male coupler 1 is inserted into the female coupler, so that each valve 10 and 15 is lifted from its respective seat to provide fluid communication between the female coupler and the male coupler. However, as indicated previously, this form of poppet valve is not essential to the invention in its broadest concept.

It will be seen that both the primary seal 17 and the secondary seal 21 provide sealing between the socket of the female coupler and the probe of the male coupler. The retainer 19 provides further sealing between the region of the seal 17 and the exterior of the female coupler. The male coupler is not required to carry any external seals.

The retainer 19 thereby provides a dual purpose of retaining and sealing and enables a simpler construction to be made. In particular three sealing regions, associated with the C-seal 17, the secondary seal 21 and the seat 24 are provided by means of only four components, namely the seals 17 and 21, the retainer 19 and the inner ring liner 22.

What is claimed is:

1. A subsea female coupler comprising a body defining a socket for the reception of a probe of a male coupler, the socket including:
   an annular shoulder and, outwardly of the shoulder, a part-conical seat which tapers towards the interior of the socket,
   an annular seal, which is disposed to provide radial sealing between the socket and the probe and is positioned in the annular shoulder, a retainer, which has a bevelled rim for abutment with said seat, to provide sealing between the region of the annular seal and the exterior of the body of the coupler, and which has a screw-threaded periphery for engagement with a complementary thread on the interior of the socket, the retainer serving to maintain the annular seal in position, and
   an inner ring liner which fits within the retainer and is positioned to abut the annular seal.

2. A coupler according to claim 1 in which the annular seal is a metal C-seal.

3. A coupler according to claim 1 in which the inner ring liner comprises a tubular part disposed within the retainer and an end flange which is held between the retainer and the body of the coupler.

4. A coupler according to claim 1, in which the retainer defines with the inner ring liner an inner annular recess bounded by an inwardly directed flange of the retainer.

5. A coupler according to claim 4 in which the inner annular recess accommodates a secondary annular seal.

6. A coupler according to claim 5 in which the secondary annular seal comprises an elastomeric seal.

7. A coupler according to claim 1 in which the retainer makes a metal-to-metal sealing region with the seat.

8. A coupler according to claim 1 in which the aforementioned socket is separated from a chamber within the body of the coupler by a valve seat and the coupler includes a poppet valve for engagement with the valve seat.

9. A subsea coupling comprising a female coupler according to claim 1 and a male coupler adapted to mate with said female coupler.

10. A subsea female coupler comprising:
   a body defining a socket for the reception of a probe of a male coupler, the socket including an annular shoulder and, outwardly of the shoulder, a part-conical seat which tapers towards the interior of the socket;
   an annular seal, which is disposed to provide radial sealing between the socket and the probe and is positioned in the annular shoulder;

a retainer, which has a bevelled rim for abutment with said seat, to provide sealing between the region of the annular seal and the exterior of the body of the coupler, the retainer serving to maintain said annular seal in position;

an inner ring liner which fits within the retainer and is positioned to abut the annular seal, said retainer having an inwardly directed flange and defining with the inner ring liner an inner annular recess bounded by said inwardly directed flange; and a secondary annular seal accommodated in said inner annular recess.

11. The subsea female coupler of claim 10, wherein said retainer has a screw-threaded periphery for engagement with a complementary thread on the interior of the socket, the retainer serving to maintain the annular seal in position.

12. The subsea female coupler of claim 10 in which the inner ring liner comprises a tubular part disposed within the retainer and an end flange which is held between the retainer and the body of the coupler.

* * * * *